Sept. 22, 1942.        A. L. THURSTON              2,296,692
                         CALCULATOR
              Filed April 11, 1941        4 Sheets-Sheet 1

INVENTOR
ARTHUR L. THURSTON
BY
ATTORNEY

Sept. 22, 1942.　　　A. L. THURSTON　　　2,296,692
CALCULATOR
Filed April 11, 1941　　　4 Sheets-Sheet 3

INVENTOR
ARTHUR L. THURSTON.
BY
ATTORNEY

Sept. 22, 1942.　　　　A. L. THURSTON　　　　2,296,692
CALCULATOR
Filed April 11, 1941　　　　4 Sheets-Sheet 4

INVENTOR
ARTHUR L. THURSTON
BY
ATTORNEY

Patented Sept. 22, 1942

2,296,692

UNITED STATES PATENT OFFICE 2,296,692

CALCULATOR

Arthur L. Thurston, Wantagh, N. Y., assignor to Cox & Stevens Aircraft Corporation, a corporation of New York Application April 11, 1941, Serial No. 388,139

18 Claims. (Cl. 33—75)

This invention relates to a calculating device for use in solving problems encountered in navigation, particularly in aerial navigation.

Such problems are customarily worked out by graphical methods, i. e., by means of vector diagrams. The use of vector diagrams in the past necessarily involved laying out on charts, by means of protractors and parallel rulers, the vectors representing the several components of motion entering into the resultant motion of the craft. Such procedure is obviously too cumbersome for satisfactory use in aircraft and the object of this invention is to provide a simple, compact calculator by means of which these navigational problems may be quickly and accurately solved.

A further object of the invention is to provide a calculator on which all settings and readings are made directly, without the necessity of making any subordinate calculations such as the addition—or subtraction—of drift angle or compass variation.

Another object of the invention is to provide a mechanism to connect two rotatable members, whereby the axis of rotation of one member may be moved toward and from the axis of the other without imparting rotation to the second member and yet any angular movement of the first member will be imparted in like magnitude and sense to the second member, regardless of the spatial relationship of their axes.

A further object of the invention is to provide a simple and effective locking means, whereby one member of the calculator may, at the will of the operator, be held stationary, or released for movement integrally with another member.

Further objects will become apparent in reading the annexed detailed description in connection with the drawings, in which:

Fig. 1 is a top view, Fig. 2 a front elevation and Fig. 3 a bottom view of a calculator according to the invention;

Figs. 4, 5 and 6 are sections through the calculator of Fig. 1 along lines 4—4, 5—5 and 6—6, respectively, the sections being enlarged for clarity;

Figure 1:
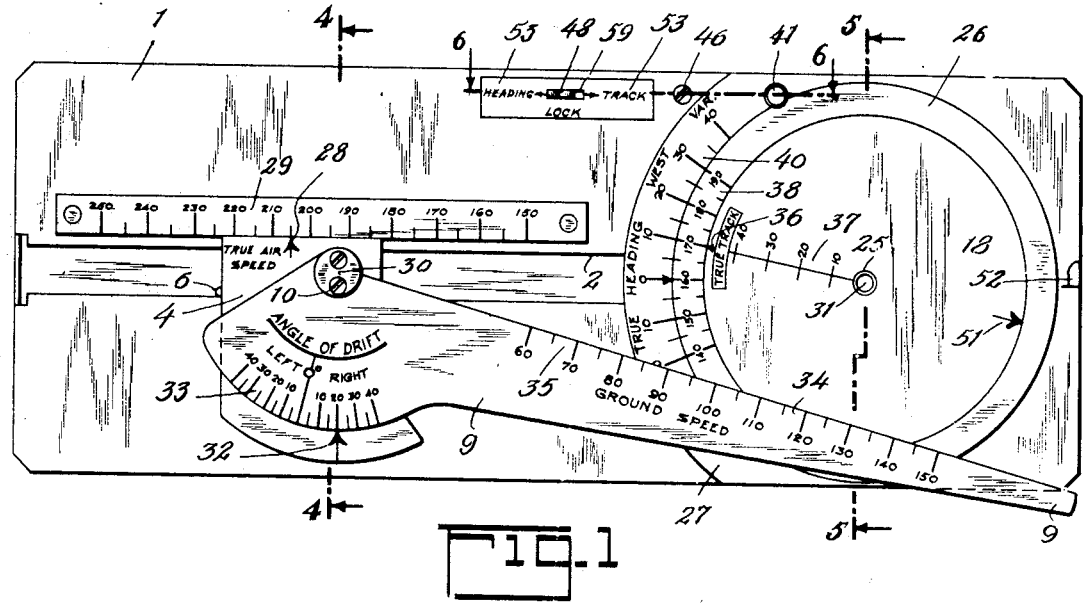
Figure 2:
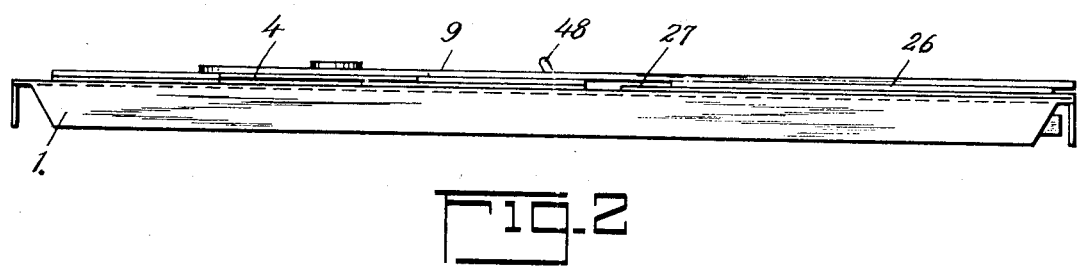

The calculator shown in Figs. 1 to 6 includes a support or frame member 1 in which are cut an elongated slot 2 and a circular hole 3. A slide member 4 is provided with grooves 5 which engage the edges of the slot to guide the slide member while permitting of its lengthwise movement in the slot. A flat spring 6 between the bottom of one of the grooves 5 and one edge of the slot 2 holds the bottom of the other groove 5 against the other edge of slot 2 so as to facilitate moving the member 4 while still preserving its proper orientation.

Rotatably attached through a hole 7 in the member 4 is a member 8 to which an arm 9 is integrally fastened as by means of screws 10. The lower part of the member 8 is machined to form two trunnions 11 which act as bearings for spur gears 12, the trunnions 11 being so spaced that the spur gears 12 are in mesh with each other. Meshed with the outer portions of the gears 12 are two racks 13. Retainers 14, with flat springs 15 exerting pressure against the outer faces of the racks, hold the latter in mesh with the gears 12. The retainers, it will be noted, are free to pivot about the trunnions 11 as dictated by the position of the racks 13. The retainers 14 and the gears 12 are prevented from slipping off the trunnions 11 as by screw heads 16.

Rotatably attached to the support 1 through the bearing hole 3 is a member 17 to which is integrally attached a disc 18 as by means of screws 19. The lower part of the member 17 is machined to form two trunnions 20 which act as bearings for spur gears 21. The trunnions 20 are so spaced that the spur gears 21 are in mesh with each other. The racks 13 which are in mesh with the outer portions of the spur gears 12 are also in mesh with the outer portions of the spur gears 21. Moreover, the racks 13 are held in mesh with the gears 21 by retainers 22 and springs 23, while the retainers 22 are free to rotate about the trunnions 20 as dictated by the position of the racks. Screw heads 24 prevent the gears 21 and the retainers 22 from slipping off the ends of the trunnions 20. A transparent disc 26 is rotatably attached to the members 17 and 18 as by means of a rivet 25 set up sufficiently tight so that unless the disc 26 is otherwise restrained it will turn with the disc 18. Fixedly attached to the frame 1 is a member 27, which in addition to building up the surface of the frame 1 under the overhanging edge of the disc 26, serves other purposes which will be apparent later.

Scales and indices are inscribed on the various members as follows: An index 28 labelled "True air speed" is inscribed at the upper edge of the member 4. This index 28 is used in conjunction with a scale 29 on the frame member 1. The index 28 and the scale 29 are positioned so that the reading at the index measures the distance between the axis of rotation 30 of the arm 9 and the axis of rotation 31 of the discs 18 and 26 to some predetermined scale of miles per hour. A second index 32 on the member 4 cooperates with an angular scale 33 marked "Angle of drift" on the arm 9, the index 32 and the scale 33 being so positioned that the index 32 is opposite zero of the scale 33 when the radial edge 34 of the arm 9 is rotated to be exactly over the axis of rotation 31 of the disc 18. The slot 2 and the axes of rotation 30 and 31 are so positioned that with the zero of the scale 33 opposite the index 32 the radial edge 34 of the arm 9 will be directly over the axis of rotation 31 for any position of the index 28 with respect to the scale 29. Along the radial edge 34 of the arm 9 is inscribed a scale 35 marked "Ground speed." The zero of this scale is at the axis of rotation 30 and the graduations are spaced the same as the graduations of the scale 29.

An index 36, marked "True track," is inscribed on the disc 18 at its periphery. There is also inscribed on the disc 18, a scale 37 extending radially from the axis of rotation 31 to the index 36, the graduations being given the same spacing as those of the scales 29 and 35. Around the edge of the transparent disc 26 is inscribed an angular scale 38, in degrees from 0 to 360, corresponding to the ordinary "compass rose." The upper surface of transparent disc 26 is slightly roughened so that pencil marks may be made thereon and erased as desired. On the member 27 which is fixedly attached to the frame 1 are inscribed an index 39 marked "True heading" and angular scales 40 marked "East" and "West" "variation" either side of the index 39. The index 39 is located on a line joining the centers 30 and 31 adjacent the degree scale 38 on the disc 26. For convenience in solution of certain problems, reverse indices 51 and 52 are inscribed on the disc 26 and the member 27 opposite the indices 36 and 39, respectively.

Figure 3:
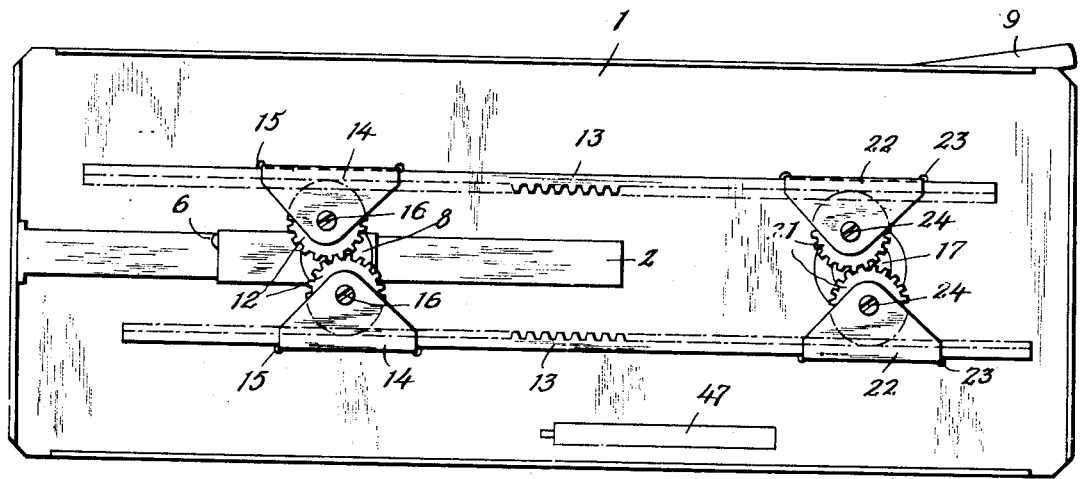
Figure 4:
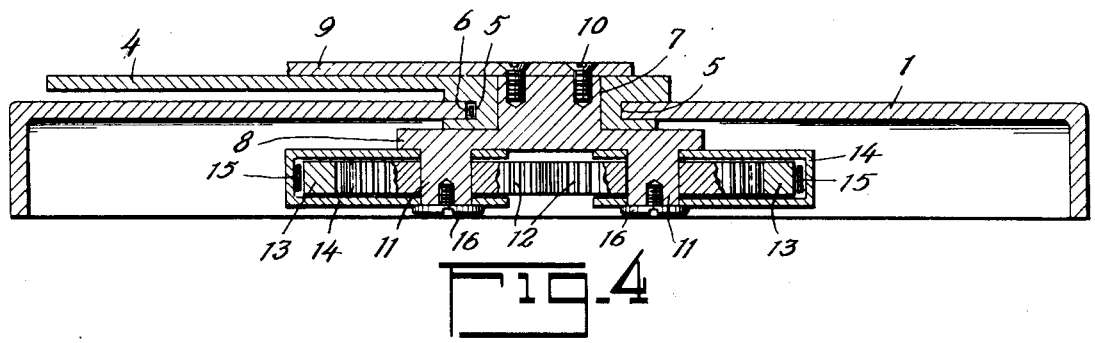
Figure 5:
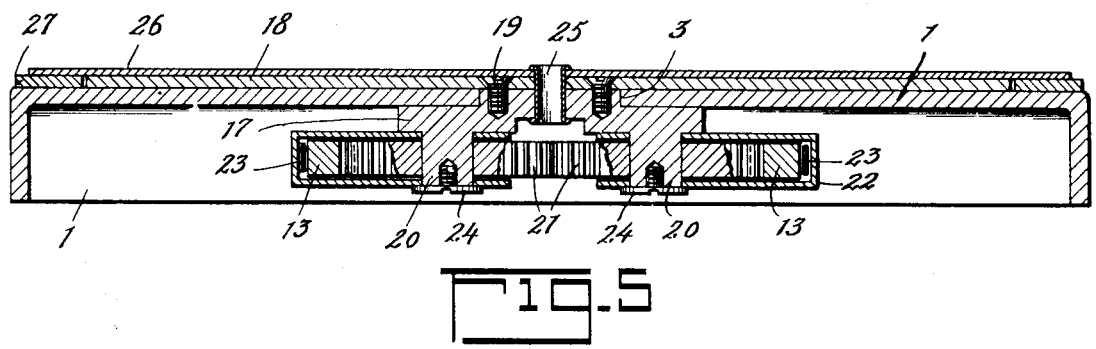

As shown in Figs. 3 and 5, the racks 13, although in a sense "floating," are prevented from getting out of mesh with the gears 12 and 21 by the flanges on the ends of the frame 1 which limit their endwise motion. When the member 4 is moved lengthwise in the slot 2 without imparting any angular movement to the arm 9 and the member 8, the gears 12 will idle and no force—and hence no motion—will be imparted to the racks 13. If the arm 9 is given an angular movement, the movement will be transmitted through part 8 and through the trunnions 11 to the gears 12, causing a differential movement in the racks 13. The differential movement of the racks 13 will in turn impart an angular movement through the gears 21 to the shafts 20 and the member 17 and to the disc 18 on which is inscribed the "true track" index 36. As the gears 12 and 21 have the same pitch diameter and number of teeth the angular movement imparted to the disc 18 will be exactly the same as the angular movement given the arm 9. The "true track" index 36 and the "true heading" index 39 are inscribed on their respective members 18 and 27 so that when the index 32 is opposite zero on the scale 33 the "true heading" index 39 and the "true track" index 36 together with the center line of radial scale 37 will exactly coincide with the radial edge 34 of the arm 9.

Figure 7:
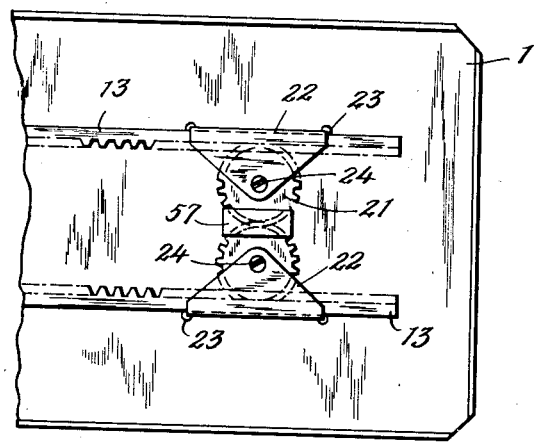
Fig. 7 is a partial bottom view of an alternative arrangement of a detail of the mechanism of the calculator of Fig. 1.

Instead of "floating," the racks 13 may be restrained as shown in Fig. 7 by integrally fastening the gears 21 to each other by some means such as soldering a plate 57 to both gears of the pair. With the gears 21 so fastened together, any angular movement of the arm 9 imparts equal and opposite forces in and movement to the racks 13 and there is no component of force tending to cause the member 4 with its "true air speed" index to creep along the slide. Regardless of whether the racks are "floating" or restrained the flanges on the ends of the frame 1 provide stops which limit the travel of the racks 13 and prevent excessive angular movement of the arm 9 and possible damage to the mechanism.

The disc 26 is rotatably attached to the disc 18 and the member 17 by the rivet 25 and will normally rotate with the disc 18 due to friction. Hence if a given reading on the "compass rose" disc 26 is set to the "true track" index 36, this reading will persist even when an angular movement is imparted to the disc 18 by means of an angular movement of the arm 9. In solving some problems it is desirable to set the disc 26 to the "true heading" index 39 and have it remain there while angular movement is imparted to the disc 18. A lock for clamping the disc 26 to the member 27 for this purpose is shown in Fig. 1 and in detail in Fig. 6. A flat head pin 41 is inserted through a hole in the member 27 and the frame 1 so that the head of the pin 41 overhangs the edge of the disc 26. A helical compression spring 42 acting between the frame 1 and a washer 43 causes the head of the pin 41 to clamp the disc 26 to the member 27 and hence to the frame 1. The washer 43 is retained on the lower end of the pin 41 as by a cotter pin 44. A block 45 is fastened to the frame 1 by screws 46 and a member 47 is rotatably fastened to the block 45 by a pin 49, one end of the member 47 being under the bottom of the pin 41. A cam lever 48 is pivotally mounted on the other end of the member 47 as by a pin 50. The upper portion of the cam lever which extends up through a slot 59 in the frame 1 is appreciably thinner than the lower portion, the shoulders or ledges so formed being given a cam profile as at 58, which bears against the bottom of the frame 1 at either side of the slot 59. With the cam lever 48 in the position as shown by the solid lines no upward pressure is exerted by the member 47 on the pin 41 so that the spring 42 causes the pin 41 to clamp the disc 26 to the member 27. When the cam lever 48 is moved to the position shown by the dotted lines, the cam action pushes that end of the member 47 down so that the other end raises the pin 41 releasing the disc 26 from the member 27, and, as explained above, the disc 26 will maintain any given setting with respect to the disc 18. The two ends of the slot in the frame 1 in which the cam lever 48 moves are suitably labelled "Heading" and "Track" as at 53 to indicate to the operator the proper position of the cam lever to maintain the "compass rose" fixed with respect to the heading index and track index, respectively.

A further understanding of the invention may be afforded by an explanation of the manner of its use to solve problems in navigation, which can best be accomplished by setting forth typical examples.

*Problem I.*—A pilot flies on a true heading—i. e., the angle between true north and the direction in which the airplane axis is pointed—of 90° (east) at a true air speed of 150 M. P. H. The wind is blowing 30 M. P. H. from the north (0 degrees). What is his ground speed, track— i. e., angle between true north and the path of the airplane over the ground—and angle of drift—i. e., angle between true heading and track?

Figure 8:
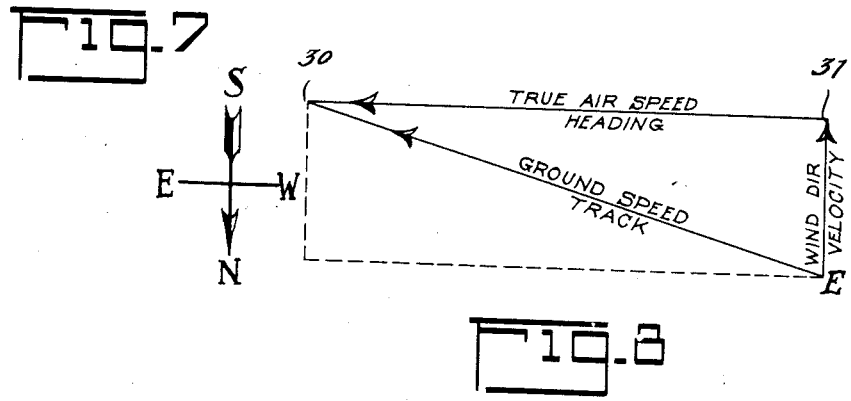
Fig. 8 is a vector solution of a navigation problem.

Fig. 8 shows a graphical solution of the problem; the solid lines showing the vector diagram as it is to be set up on the calculator.

Figure 9:
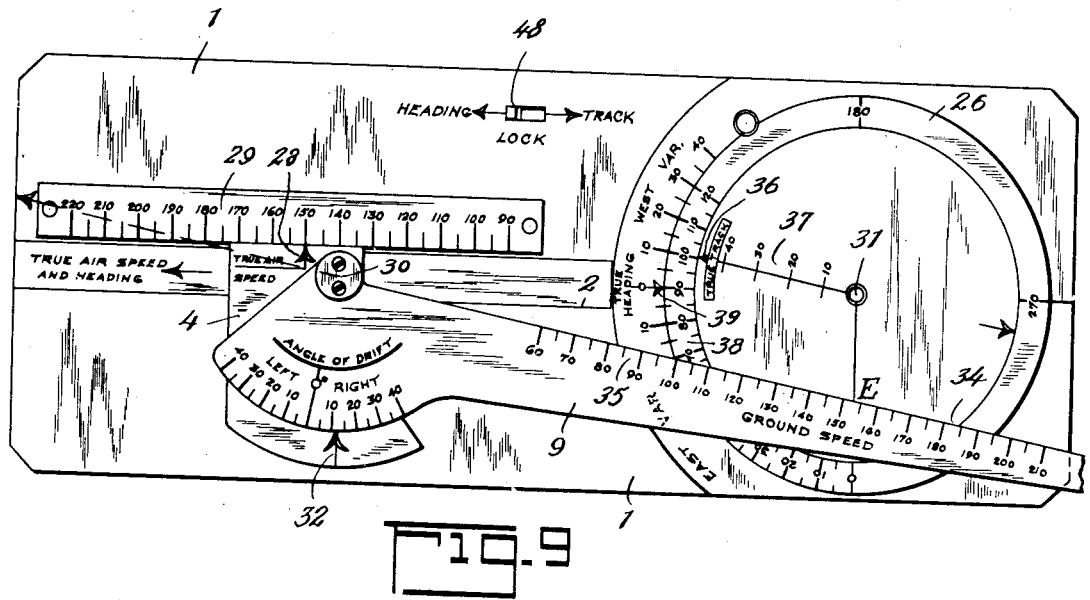
Fig. 9 shows the same problem set up on the calculator.

To accomplish this, move the cam lever 48 to the "track" lock position; rotate the disc 26 until the direction from which the wind is blowing (zero) on the scale 38 is over the "true track" index 36; draw a pencil line from the 30 mark of the scale 37 to the axis or center of the disc 26 at 31; and label the point over the 30 mark E. Rotate the disc 26 until 90° (the true heading of the airplane) on the scale 38 is at the "true heading" index 39, and lock this setting by putting the lever 48 in the "heading" lock position. Slide the member 4 in the slot 2 until "true airspeed" index 28 is at 150 on the scale 29. Rotate the arm 9 until edge 34 is over point E. The various members are then in the position shown in Fig. 9. At the point E read the ground speed 153 M. P. H. on the scale 35. At the "true track" index 36 read the track 101½° on the degree scale 38 of the disc 26. At the index 32 on the scale 33 read the angle of drift 11½° right. It should be noted that due to the mechanism of gears and racks the radial edge 34 is always parallel to the line from the "true track" index 36 to the axis or center 31. Therefore, the angle between the "true heading" index 39 and the "true track" index 36 is always equal to the angle of drift.

*Problem II.*—A common problem in scheduled flight operation is to determine the true air speed and heading necessary to make good a given ground speed and track. For example the course (or track desired to be made good) from A to B is 90°, true, and it is desired to make good a ground speed of 180 M. P. H. What heading and true air speed is required when the wind is 30 M. P. H. from the north (0 degrees)?

First the lever 48 is moved to the "track" lock position and the wind vector is marked on the disc 26, the same as in the preceding example. The disc 26 is then rotated until 90° on the scale 38 is at the "true track" index. The arm 9 is then moved until 180 on the "ground speed" scale 35 is over point E on the disc 26. The true heading 80° is read at the "true heading" index 39 and the true air speed required 183 M. P. H. is read at "true air speed" index 28. It is not necessary to determine the angle at drift although this may be read at index 32 if desired.

*Problem III.*—In the above problems we have dealt with six variables, namely, wind velocity, direction, ground speed, track, air speed, and heading. If any four of these variables are known the other two may be determined on the calculator. Thus wind speed and direction may be determined if the other four variables are known. If the angle of drift is known this may be used in place of either the track variable or heading variable.

Determination of wind direction and velocity by the well known "double drift" method is solved as follows:

Known: True air speed 180 M. P. H.
  1st heading 90° true; angle of drift 5° R.
  2nd heading 10° true; angle of drift 8° L.
Determine the wind direction and velocity.

First with the lever 48 in the "track" lock position, set "true air speed" index 28 at 180 M. P. H. on the scale 29; next rotate the disc 26 until the first heading 90° is at the "true heading" index 39 and move the lever 48 to "heading" lock; set 5° R on angle of drift scale 33 to index 32 and draw a pencil line on the disc 26 along the radial edge 34 of the arm 9; shift the lever 48 to "track" lock, and rotate the disc 26 until the second heading 10° is opposite "true heading" index 39 and move the lever 48 to "heading" lock; set 8° L on angle of drift scale 33 to index 32 and draw a second pencil line on the disc 26 along the edge 34 of the arm 9; shift the lever 48 to "track" lock, and rotate the disc 26 until the intersection of the pencil lines is over the scale 37, and on this scale at the intersection read the wind velocity, 30 M. P. H.; at the "true track" index 36 read on the scale 38 the direction, 65°, from which the wind is blowing.

Problems of interception and operations from a moving base such as an airplane carrier, may also be solved on the navigation calculator. Typical of this type of problem is the following:

*Problem IV.*—The wind is 30 knots from the east (90°). The aircraft carrier is steering due north (0°) at 20 knots. The airplane leaves the carrier at 180 knots true air speed to scout on a bearing from the carrier of 45° and returns on the same bearing, i. e., the bearing of the airplane from the carrier is at all times 45°

Determine for the outward leg:
  Rate of departure (relative to carrier)
  True heading required (out)
  Ground speed and track (out)
Determine for the return leg:
  Rate of return
  True heading required (return)
  Ground speed and track (return)

First with lever 48 at "track" lock mark on the disc 26 the wind vector by setting 90° on compass rose scale 38 at the "true track" index 36 and marking a point on the disc 26 above 30 knots on the wind scale 37 label this point "E." Label the center 31 of the disc 26 "W." E to W is the wind vector.

Second, from E mark a vector on the disc 26 corresponding to the carrier's course and speed. To do this rotate the disc 26 until 0° (carrier's course) on the scale 38 is at the "true track" index. Move the arm 9 until the edge 34 is over the point E and using the scale 35 along the edge 34 to measure by, measure off 20 knots from E in the direction of the "true track" arrow and mark a point on the disc 26. Label this point "C." From E to C represents the carrier's course and speed and therefore from C to E represents the movement of the air relative to the carrier if there were no wind. As E to W represents the wind direction and velocity relative to the earth, then the resultant vector C to W represents the movement of the air relative to the carrier or as it is commonly called "relative wind."

With the lever 48 still in the "track" lock position, set 45° on scale 38 at the "true track" index 36. Set the "true air speed" index 28 at 180 knots on the scale 29. Swing the arm 9 until the edge 34 is over the dot marked C on the disc 26. At this point read the rate of departure, 144 knots relative to the carrier, on the ground speed scale 35. At the "true heading" index 39 read 48°, the true heading required. Move the lever 48 to "heading" lock and swing the arm 9 until the edge 34 is at the dot marked E on the disc 26. At this point read the ground speed, 159 knots, on the ground speed scale 35, and read the true track, 40°, at the "true track" index 36.

For the return leg move the lever 48 to the "track" lock position. Rotate the disc 26 until the reverse of 45°—or 225°—on the scale 38 is at the "true track" index 36. For a check note that 45° is at reverse index 51. Swing the arm 9 until the edge 34 is at the dot on the disc 26 marked C. At this point read the rate of return, 215 knots, on ground speed scale 35 and read the true heading required, 223°, at the "true heading" index 39. Move the lever 48 to the "heading" lock position. Swing the arm 9 until the edge 34 is at the dot marked E on the disc 26. At this point read the ground speed, 201 knots, on the ground speed scale 35 and at the "true track" index 36 read the track, 229°.

In the above illustrations winds, headings and tracks have been given in "true," that is, in relation to the geographic North Pole. East and west variation scales 40 may be provided on either side of the "true heading" index 39, so that where the above data are magnetic the mark corresponding to the magnetic variation for the locality in which the plane is operating may be used in conjunction with the "compass rose" scale 38 on the disc 26. A similar variation scale, not shown in the drawings, may be inscribed on the disc 18 on either side of the "true track" index 36 so that track could be set or read directly in magnetic.

As a vector diagram is actually set up on the navigational calculator any problem involving similar vectors within the range of the various scales and angles may be set up and solved.

Figure 10:
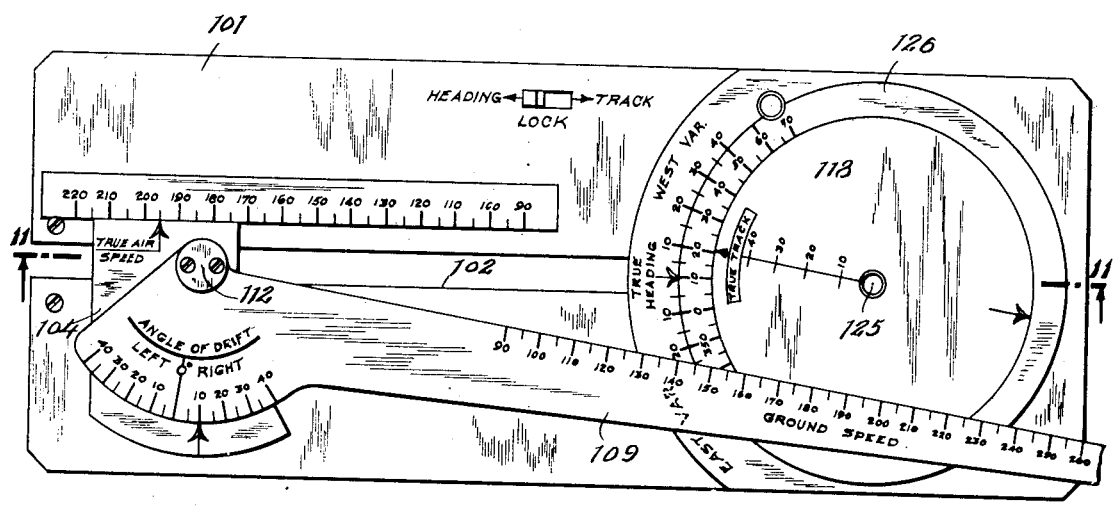
Figs. 10 and 11 are top view and longitudinal section, respectively, of another example of the invention.
Figure 11:
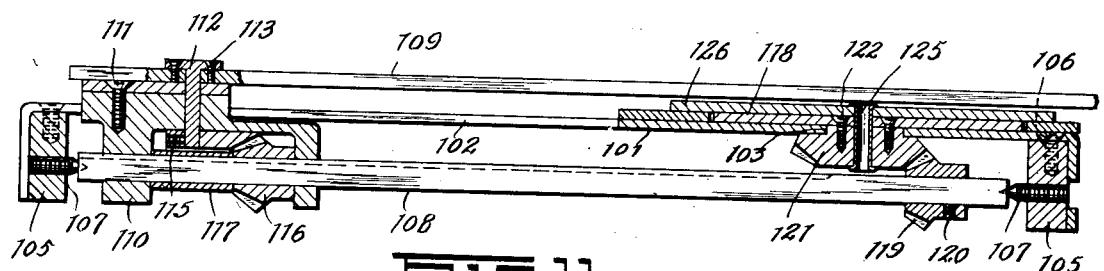

Another example of a calculator according to my invention is shown in Figs. 10 and 11. It differs from the one shown in Figs. 1 to 6 in that a bevel gear mechanism is used to reproduce in the track index disc the angular motion of the arm. The construction, in so far as it differs from that of the example of Figs. 1 to 6, is as follows. A base member 101 is provided with a slot 102 and a circular hole 103. Blocks 105 are attached at each end of the base 101 as by screws 106. Pointed screws 107 are threaded into these blocks. The keyed shaft 108 is rotatably mounted on the points of the screws 107 which are inserted in conical recesses in its ends. A member 110 is arranged to slide freely on the shaft 108 and in the slot 102. The member 110 projects above the base 101 and a member 104 is attached to the projecting portion by means of the screws 111. An arm 109 is attached to a flat head pin 112 as by means of screws 113. The pin 112 projects through a bearing hole in the member 110 and has attached to its lower end a bevel gear segment 114 as by means of a set screw 115. In mesh with the bevel gear segment 114 is a bevel gear 116 which is feather-keyed to the shaft 108. A spacer 117 holds the bevel gear 116 in proper mesh with the bevel gear segment 114. A second bevel gear 119 is attached to the shaft 108 as by means of a set screw 120. The bevel gear 119 is in mesh with a bevel gear 121 whose hub extends rotatably through the hole 103 in the base 101 and to the end of the hub is attached a disc 118 as by means of screws 122. A transparent disc 126 is rotatably attached to the disc 118 and the bevel gear 121 by means of the rivet 125 in the same manner as described above for the detachment of the disc 26 of Figs. 1 and 5. The bevel gear pair 119—121 has the same ratio as the pair 116—114.

The same results are obtained with this mechanism as with that of Figs. 1 to 6. The arm 109 with its attached parts; namely pin 112, member 110, bevel gears 114 and 116 and spacer 117, may be moved to any position in the slot 102 along the shaft 108 and any angular movement given to the arm 109 will be transmitted through the pin 112, the bevel gears 114 and 116, the shaft 108 and the bevel gears 119 and 121 and impart the same angular movement to the disc 118. The arrangement of the other members and the layout of scales and indices are the same as for the corresponding parts of the example of Figs. 1 to 6. The same method of operation will therefore apply.

Figure 6:
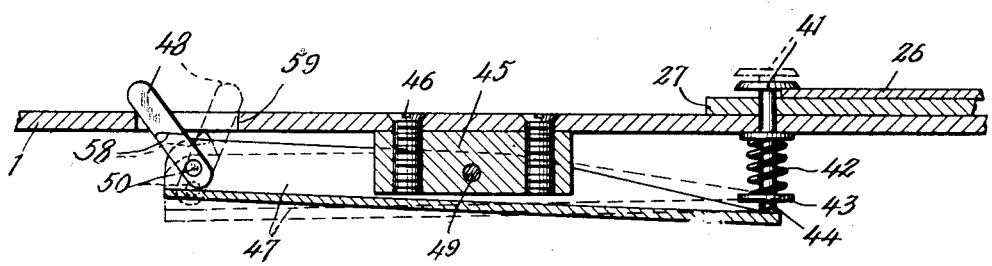
Figure 12:
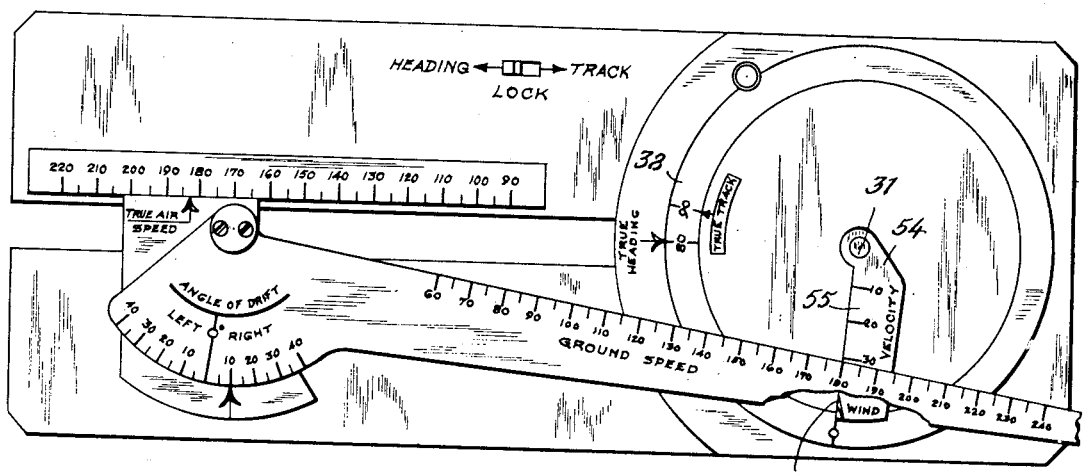
Fig. 12 is a modification applicable to either example.

Fig. 12 shows a modification of the invention in which the wind speed scale 37 in Figs. 1 and 6 is omitted from the disc 18 and an additional wind arm member 54 is pivotedly attached at the axis 31 on top of the disc 26, the arm 54 having inscribed on it a wind scale 55 and a "wind direction" index 56. In use the arm 54 is rotated until the "wind direction" index 56 registers with a reading on the scale 38 corresponding to the direction from which the wind is blowing and the wind vector is then represented by the distance from the proper division on the wind velocity scale 55 to the axis 31. This eliminates the use of a pencil in solving many of the most common problems of aerial navigation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a calculator, a base member, two concentric rotatable members carried by said base member, a third rotatable member carrried by said base member, said third rotatable member having its axis of rotation spaced from the axis of rotation of said two concentric rotatable members, means selectively operable to restrain one of said concentric rotatable members against rotation, and a connection between said third rotatable member and one of said two concentric rotatable members adapted to impart to one or both said concentric rotatable members, in response to rotational movement of said third rotatable member, like angular movement of like magnitude and sense, depending upon whether or not the rotational movement of the one said concentric rotatable member is restrained.

2. In a calculator, a base member, two concentric rotatable members carried by said base member, a third rotatable member carried by said base member, a connection between said third rotatable member and one of said two concentric rotatable members adapted to impart thereto, in response to rotational movement of said third rotatable member, like angular movement of like magnitude and sense, and means operable to lock and release the one said concentric rotatable member with respect to the other.

3. In a calculator, a base member, two concentric rotatable members carried by said base member, a third rotatable member carried by said base member, the axis of rotation of said third rotatable member being movable toward and from the axis of rotation of said two concentric rotatable members, a connection between said third rotatable member and one of the two concentric rotatable members adapted to impart to the latter, in response to rotational movement of the third rotatable member, like angular movement of like magnitude and sense, regardless of the spatial relationship of the member axes, and means operable to lock and release the one said concentric member with respect to the other whereby one or both may simultaneously partake of the third member movement.

4. In a calculator, a base member, two cooperating members, one of which is rotatable about a fixed axis and the other of which is both rotatable and movable bodily toward and from said axis, said rotatable members being carried by said base member, and a connection between said rotatable members adapted to impart to the member having a fixed axis of rotation in response to movement of the other said member, like angular movement of like magnitude and sense, said connection including parallel racks and two pairs of pinions, one pinion of each pair meshing with the other pinion of each pair and with one of said racks.

5. In a calculator, a pair of relatively movable members variably spaced one from the other, and a connection between said members including parallel racks and two pairs of pinions, the pairs of pinions being associated respectively with the said two rotatable members, said connection being adapted to impart to one said member, in response to movement of the other said member, like angular movement of like magnitude and sense, regardless of any variation in the spacing of said members.

6. In a calculator, a base member, two rotatable members carried by said base member, the axis of rotation of one said rotatable member being freely movable toward and from the axis of rotation of the other, and a rack and pinion connection between said rotatable members adapted to impart to one said member, in response to rotational movement of the other said member, like angular movement of like magnitude and sense, regardless of the spatial relationship of the member axes.

7. In a calculator, a base member, a rotatable member carried by said base member, a member connected with and movable to rotate said rotatable member, a second rotatable member having an axis of rotation concentric with the axis of rotation of said first mentioned rotatable member, and means selectively operable to cause said two rotatable members to rotate in unison or the one with respect to the other in response to the other in response to operating-member movement.

8. In a calculator, a base member, two concentric rotatable members carried by said base member, a mounting pin common to both rotatable members, said mounting pin being rotatable to rotate both said members in unison, and means selectively operable to frictionally hold one said rotatable member against rotation, and means operable to rotate said mounting pin.

9. In a calculator, a base member, a rotatable member carried by said base member, said rotatable member having indicated thereon a marking, a member operable to rotate said rotatable member, a second rotatable member, said second rotatable member having indicated thereon a marking adapted for cooperation with the marking on said first mentioned rotatable member, and means selectively operable to cause said two rotatable members to rotate in unison or the one with respect to the other in response to operating-member movement.

10. In a calculator, a base member, said base member having indicated thereon a marking, a rotatable member carried by said base member, said rotatable member having indicated thereon a marking, a member operable to rotate said rotatable member, a second rotatable member, said second rotatable member having indicated thereon a marking adapted for cooperation with the marking on said first mentioned rotatable member as well as with the marking on said base member, and means selectively operable to cause said two rotatable members to rotate in unison or the one with respect to the other in response to operating-member movement.

11. In a calculator, a base member, a rotatable member carried by said base member, said rotatable member having indicated thereon a marking, a member operable to rotate said rotatable member, said operating member having indicated thereon a marking, a second rotatable member, said second rotatable member having indicated thereon a marking adapted for cooperation with the marking on said first mentioned rotatable member and being adapted to have indicated thereon a further marking intended for cooperation with the marking on said operating-member, and means selectively operable to cause said two rotatable members to rotate in unison or the one with respect to the other in response to operating-member movement.

12. In a calculator, a base member, said base member having indicated thereon a marking, a rotatable member carried by said base member, said rotatable member having indicated thereon a marking adapted for cooperation with the marking on said base member and being adapted to have indicated thereon a further marking, a slide member carried by said base member and movable bodily toward and from the axis of rotation of said rotatable member, said slide member having indicated thereon a marking, a member carried by and movable with respect to said slide member, said last mentioned member having indicated thereon separate markings, one adapted for cooperation with the marking on said slide member and the other intended for cooperation with the marking adapted to be indicated on said rotatable member, and a connection between the slide-carried member and said rotatable member adapted to rotate said rotatable member accordingly as said slide-carried member is moved.

13. In a calculator, a base member, two rotatable members carried by said base member, a member operable to rotate said two rotatable members in unison, and means selectively operable to restrain the movement of one said rotatable member so that the other said rotatable member may rotate alone in response to operating-member movement.

14. In a calculator, a base member, two rotatable members carried by said base member, a member operable to rotate said two rotatable members in unison, and means selectively operable to clamp one said rotatable member against rotation and to said base member so that the other said rotatable member may rotate alone in response to operating-member movement.

15. In a calculator, a base member, two rotatable members carried by said base member, one said rotatable member as it is rotated being capable of movement simultaneously toward and from the other, and means interconnecting said rotatable members adapted to impart to one thereof in response to rotational movement of the other, like angular movement of like magnitude and sense, regardless of their spatial relationship.

16. In a calculator, a base member, two rotatable members, one said rotatable member having a fixed axis of rotation and the other an axis of rotation movable toward and from said fixed axis member simultaneously as the latter is rotated, and means interconnecting said rotatable members adapted to impart to the member having a fixed axis of rotation, in response to rotational movement of the other said rotatable member, like angular movement of like magnitude and sense, regardless of the spatial relationship of the member axes.

17. In a plotting and calculating device, a first rotatable member supporting a pair of pinions in mesh with each other, a second rotatable member supporting a second pair of pinions in mesh with each other, and two parallel racks, one pinion of each pair meshing with one of the parallel racks and the other pinion of each pair meshing with the other of the parallel racks whereby as one said member is rotated the other will partake at all times of like angular movement of like magnitude and sense.

18. In a plotting and calculating device, a first rotatable member supporting a pair of pinions in mesh with each other, a second rotatable member supporting a second pair of pinions in mesh with each other, one said member being movable bodily toward and from the other, and two parallel racks, one pinion of each pair meshing with one of the parallel racks and the other pinion of each pair meshing with the other of the parallel racks whereby as one said member is rotated the other will partake at all times of like angular movement of like magnitude and sense regardless of the spatial relationship of said members.

ARTHUR L. THURSTON.